United States Patent [19]

Adlerborn

[11] 4,081,272
[45] Mar. 28, 1978

[54] METHOD FOR HOT ISOSTATIC PRESSING POWDER BODIES

[75] Inventor: Jan Adlerborn, Robertsfors, Sweden

[73] Assignee: ASEA Aktiebolag, Vesteras, Sweden

[21] Appl. No.: 654,599

[22] Filed: Feb. 3, 1976

[30] Foreign Application Priority Data

Feb. 3, 1975 Sweden .............................. 7501140

[51] Int. Cl.² .............................................. B22F 3/14
[52] U.S. Cl. ........................................ 75/223; 75/226; 264/111
[58] Field of Search .................. 75/226, 223; 264/111; 29/420.5

[56] References Cited

U.S. PATENT DOCUMENTS

| Re. 28,301 | 1/1975 | Havel | 75/226 X |
| 3,455,682 | 7/1969 | Barbaras | 75/223 X |
| 3,469,976 | 9/1969 | Iler | 75/223 X |

*Primary Examiner*—Richard E. Schafer
*Attorney, Agent, or Firm*—Watson, Cole, Grindle & Watson

[57] ABSTRACT

In manufacturing objects by isostatic pressing of a preformed powder body enclosed in a deformable casing at elevated temperatures and pressures, the body of powder is preformed and is then arranged in a glass capsule of a first material which is embedded in a glass powder having a higher softening temperature than the first material. The capsule with the embedded body is evacuated and sealed, and the capsule with its contents is heated and subjected to isostatic pressure.

4 Claims, 1 Drawing Figure

U.S. Patent
March 28, 1978
4,081,272
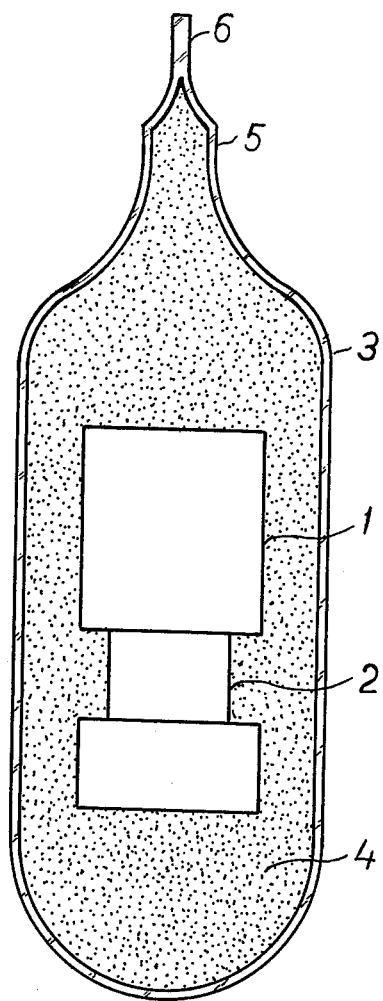

METHOD FOR HOT ISOSTATIC PRESSING POWDER BODIES

BACKGROUND OF THE INVENTION

1. Field of the Invention

The present invention relates to a method for manufacturing objects, starting from a powder, by pressing a preformed powder body at such a high pressure and such a high temperature that a density and bonding of the powder grains of almost 100% are obtained. The invention is particularly adapted for pressing materials which require a very high pressing temperature and which have shapes such that it is difficult to provide a capsule with the same shape as the body to be pressed. It is therefore particularly suited for the manufacture of bodies of special materials which are difficult to machine, such as silicon nitride, boron nitride, super-alloys, etc. The pressing can be performed in any pressure furnace in which the necessary temperature and the necessary pressure can be maintained.

2. The Prior Art

In U.S. Pat. No. 3,622,313 to Havel, there is described a method of manufacturing bodies of powder. Powder is filled into a glass capsule having the same shape as the finished product is to have, whereafter the glass capsule is evacuated, sealed, heated to softening and subjected to a high all-sided pressure in a pressure furnace. The density of the powder in the capsule is low and the shrinking during the hot pressing will be great. It is not possible to obtain the same density in different capsules, and therefore the dimensions of finished bodies may very within rather wide limits. The method does not make possible the pressing of bodies having very irregular or complicated shapes.

Patent application Ser. No. 400,049, filed Sept. 24, 1973, describes a method of manufacturing bodies starting from a powder, in which a body is preformed by isostatic extrusion so that a manageable powder body is obtained. Approximately the same density can be achieved during different pressings. By machining pre-pressed powder bodies, the desired measurements and complicated shapes can be exactly obtained. Because of the even density in the powder bodies, an equal degree of shrinking is obtained during a subsequent hot pressing and a great accuracy of measurement is thereby obtained in the finished products. According to this method, glass capsules are used which are so large that a clearance is formed between the capsule wall and the preformed powder body, and the glass capsule is allowed to acquire the shape of the powder body when it becomes workable after heating. However, materials for capsules which may be used at very high temperatures, for example glass with a high silica content for capsules for pressing silicon nitride requiring a pressing temperature of more than 1400° C, are difficult to work and difficult to handle.

SUMMARY OF THE INVENTION

The invention relates to a method which eliminates drawbacks in the above-mentioned method. According to the invention, powder is pre-pressed into a body of the desired shape, for example by isostatic extrusion of a given amount of powder in a plastic capsule, so that a body having a stable shape is obtained. If required, this body may be machined to the desired dimensions. The powder body produced is placed in a glass capsule of a first glass material which softens and becomes mouldable at a relatively low temperature and is embedded in a powder of a second glass material which softens at a higher temperature and which, at the pressing temperature, still has a high viscosity such that it is able to serve as a casing surrounding the pressed body and act as a barrier to prevent the pressure medium from penetrating into the pores of the embedded body. After one or more bodies have been placed in an open glass capsule and embedded in glass powder, the capsule is evacuated and sealed. The evacuation can be carried out at elevated temperature. After evacuation and sealing, the glass capsule is heated to a temperature above the softening temperature of the glass, so that the glass capsule becomes deformable, whereafter the capsule is subjected to a high pressure and a high temperature simultaneously in a pressure furnace. The first heating operation can be performed in a separate preheat furnace, but there is nothing preventing the whole heating process from being performed in the pressure furnace.

During the first part of the heating, the glass capsule, which surrounds the powder body and the glass powder in which the body is embedded, acts as a gas-tight barrier. Through the reaction between the material in the capsule, which melts at low temperature, and the glass powder having a high melting point inside the capsule, a glass layer impenetrable to gas is formed. As the temperature rises, this layer is moved further and further in towards the embedded powder body. Despite the fact that the original capsule of glass, having a low melting point, melts away, a gas-impermeable layer is constantly present, preventing a gaseous pressure medium from penetrating into the powder body and preventing it from being compressed into great density.

The following species of glass can be used. The glass species are arranged according to increasing softening and melting temperatures:

1. Lead silicate glass
2. Boron silicate glass (Pyrex ®)
3. Aluminium silicate glass
4. Glass with 96% silicic acid (Vycor ®)
5. Pure silicic acid (quartz).

For pressing boron nitride bodies, a capsule of boron silicate glass and a glass powder with 96% silicic acid or pure silicic acid may be used. A capsule of boron silicate glass softens and becomes deformable at 550°–600° C so that the pressure may be applied at this temperature. In the temperature range 900°–1000° C the viscosity of the glass of the capsule is so low that the glass flows, but at this temperature a compound is obtained in the boundary layer between the boron silicate glass and the silicic acid powder which forms a gas-tight layer, and this layer forms a capsule from which the boron silicate glass runs off. When the temperature is further increased, the layer is displaced inwardly and prevents the pressure medium from penetrating into the embedded powder body even at temperatures of more than 1700° C which are required in order to obtain dense silicon nitride bodies.

In performed laboratory tests, a prepressed silicon nitride body was embedded in a boron silicate glass capsule so that the body was surrounded by a 10 mm thick layer of quartz powder. The capsule was first evacuated at room temperature, and then at 500° C to remove moisture and gases. Thereafter the capsule was sealed by melting off the evacuating tube. The capsule was placed in a pressure furnace which was filled with argon gas to 1 atmosphere and heated to 600° C. At this temperature boron silicate glass is plastically workable.

The pressure was maintained constant during the heating. The pressure was raised to 120 MPa by pumping in additional argon gas. Thereafter the temperature was raised to 1725° C, the pressure then increasing to 248 MPa. The temperature and the pressure were maintained at this level for two hours. It was found that the major part of the boron silicate glass had melted and run away, but that there was a gas-impenetrable glass layer at the outer part of the quartz powder compound. Trials made show that the method is possible to carry through.

BRIEF DESCRIPTION OF THE DRAWINGS

The invention is described in more detail with reference to the accompanying FIGURE.

DESCRIPTION OF THE PREFERRED EMBODIMENTS

In this embodiment, the numeral 1 denotes a pre-stressed and machined body which is formed with a middle section 2 having smaller cross-section than the rest of the body. The body 1 is located inside a glass capsule 3 of boron silicate glass and is embedded in quartz powder 4. After inserting the body 1, the upper part of the capsule is shaped into an evacuating tube 5. After evacuating the capsule, the tube 5 is melted. The outermost fused part is designated 6.

I claim:

1. Method for manufacturing objects by isostatic pressing of a preformed powder body enclosed in a deformable casing at such an elevated temperature and such a pressure that the powder grains are bonded and the body is compressed to a density near the theoretically possible density, which comprises:
    (a) preforming a body of powder;
    (b) arranging the body in a glass capsule of a first material and embedding the body in a glass powder of a second material with a higher softening temperature than the first material;
    (c) evecuating and sealing the capsule with the embedded body;
    (d) heating the capsule with its contents to at least the softening temperature of the first material and subjecting it in a pressure furnace to an isostatic pressure from a pressure medium.

2. A method according to claim 1, in which the capsule is formed of a glass with a relatively low softening temperature, and the glass powder has a high silicic acid content.

3. A method according to claim 1 in which the body is of silicon nitride and is pressed at a temperature exceeding 1600° C.

4. A method according to claim 3, in which the compacting pressure exceeds 50 MPa.

* * * * *